United States Patent
Liu

(10) Patent No.: US 10,149,206 B2
(45) Date of Patent: Dec. 4, 2018

(54) AUTOMATIC DATA LINK SWITCHING METHOD FOR TERMINAL, AND TERMINAL

(71) Applicant: ZTE Corporation, Shenzhen (CN)

(72) Inventor: Caifeng Liu, Shenzhen (CN)

(73) Assignee: XI'AN ZHONGXING NEW SOFTWARE CO., LTD., Xi'An (CN)

(*) Notice: Subject to any disclaimer, the term of this patent is extended or adjusted under 35 U.S.C. 154(b) by 0 days.

(21) Appl. No.: 15/123,944

(22) PCT Filed: May 13, 2014

(86) PCT No.: PCT/CN2014/077400
§ 371 (c)(1),
(2) Date: Nov. 29, 2016

(87) PCT Pub. No.: WO2015/131442
PCT Pub. Date: Sep. 11, 2015

(65) Prior Publication Data
US 2017/0086101 A1  Mar. 23, 2017

(30) Foreign Application Priority Data
Mar. 6, 2014  (CN) .......................... 2014 1 0081831

(51) Int. Cl.
*H04W 36/00* (2009.01)
*H04W 76/10* (2018.01)
(Continued)

(52) U.S. Cl.
CPC ........ *H04W 36/0011* (2013.01); *H04W 36/14* (2013.01); *H04W 76/10* (2018.02); *H04W 88/06* (2013.01)

(58) Field of Classification Search
CPC . H04W 36/0011; H04W 76/02; H04W 36/14; H04W 88/06
See application file for complete search history.

(56) References Cited

U.S. PATENT DOCUMENTS

2004/0066769 A1* 4/2004 Ahmavaara ......... H04L 12/2856
370/338
2010/0177629 A1  7/2010 Payyappilly
(Continued)

FOREIGN PATENT DOCUMENTS

| CN | 102835092 A | 12/2012 |
|---|---|---|
| EP | 2549783 A1 | 1/2013 |
| WO | 20120170440 A1 | 12/2012 |

OTHER PUBLICATIONS

International Search Report for corresponding application PCT/CN2014/077400 filed on May 13, 2014; dated Dec. 4, 2014.
(Continued)

Primary Examiner — Mohammad S Anwar
(74) Attorney, Agent, or Firm — Cantor Colburn LLP

(57) ABSTRACT

A terminal and an automatic data link switching method for a terminal are provided. The method includes that: an AP retrieves an APN required by establishment of a data link of a connection of a first network after receiving from a MODEM a notice of establishing the connection of the first network, and when an APN retrieval result is null, sends to the MODEM a notice of switching to a connection of a second network; and the MODEM switches to the second network after receiving from the AP the notice of switching to the connection of the second network, and sends a notice to the AP. By the method and terminal, when there is no APN required by the connection of the first network and a data service cannot be normally used, the terminal can be automatically switched to the second network for establishment of the data link.

10 Claims, 3 Drawing Sheets

(51) Int. Cl.
*H04W 36/14* (2009.01)
*H04W 88/06* (2009.01)

(56) References Cited

U.S. PATENT DOCUMENTS

| | | | | |
|---|---|---|---|---|
| 2012/0069823 | A1* | 3/2012 | Low | H04W 4/00 370/335 |
| 2012/0314562 | A1* | 12/2012 | Zhao | H04W 76/02 370/216 |
| 2015/0208463 | A1* | 7/2015 | Yang | H04W 76/064 370/329 |

OTHER PUBLICATIONS

EP Search Report Application dated Dec. 9, 2016 re: Application No. EP14885029; pp. 1-12; citing: WO2012/170440 A1 and EP 2 549 783 A.

* cited by examiner

AUTOMATIC DATA LINK SWITCHING METHOD FOR TERMINAL, AND TERMINAL

TECHNICAL FIELD

The present disclosure relates to the field of mobile communication, and in particular to an automatic data link switching method for a terminal, and a terminal.

BACKGROUND

High Rate Packet Data (HRPD), also called Evolution-Data Optimized (EVDO), is a Code Division Multiple Access (CDMA) (based on a 3rd Generation Partnership Project 2 (3GPP2) protocol specification)-based high rate wireless data technology. In recent years, a 4th-Generation (4G) communication technology has become mature, and a 4G Long Term Evolution (LTE) network has been widely applied due to its ultrahigh data transmission speed and high performance. Since LTE is based on a 3GPP protocol specification, Enhanced High Rate Packet Data (eHRPD) emerges as a bridge of development from CDMA to LTE. The eHRPD is an evolution and enhancement of an original HRPD network. The eHRPD adopts a core network of LTE and an access network of EVDO, which makes smooth switch between eHRPD and LTE possible. A network convergence manner is improved to make resources reasonably utilized. The eHRPD and HRPD adopt different data link establishment manners. Specifically, a remarkable difference lies in that accessing an eHRPD network requires using an Access Point Name (APN) the same as that used for access to an LTE network as an access parameter to establish a data link, while no APN is required by access to an HRPD network and establishment of a data link. However, if a terminal is currently registered in an eHRPD network, when the terminal is not able to acquire an APN required by establishment of a data link in the eHPRD network, the data link cannot be established, and the data service is not available to the terminal.

The present disclosure is intended to solve the abovementioned problem under such a technical background.

SUMMARY

This part provides general descriptions about the technical solution of the present disclosure rather than a full scope or all characteristics of the technical solution of the present disclosure.

The solutions provided by the embodiments of the present disclosure can implement automatic switching to another network for establishment of a data link under the condition that the data link cannot be normally established due to absence of an APN required by network connection.

According to an embodiment of the present disclosure, an automatic data link switching method for a terminal is provided, which includes that: an Application Processor (AP) retrieves an APN required by establishment of a data link of a connection of a first network after receiving from a MODEM a notice of establishing the connection of the first network, and when an APN retrieval result is null, sends to the MODEM a notice of switching to a connection of a second network; and the MODEM switches to the second network after receiving from the AP the notice of switching to the connection of the second network, and sends to the AP a notice of establishing a data link of the connection of the second network.

In an exemplary embodiment, establishment of the data link of the connection of the first network may require an APN as an access parameter, and establishment of the data link of the connection of the second network may not require any APN as an access parameter.

In an exemplary embodiment, the step that the AP retrieves the APN required by the establishment of the data link of the connection of the first network may include that information of a Subscriber Identity Module (SIM) card is read, and the APN is retrieved in an APN database according to the information of the SIM card.

In an exemplary embodiment, the information of the SIM card may be information of an operating company of the SIM card; the APN database may include a pre-integrated correspondence between each operating company and an APN corresponding to the operating company; and the step that the APN is retrieved in the APN database according to the information of the SIM card may include that the APN database is searched for a matched APN of the operating company according to the information of the operating company of the SIM card.

In an exemplary embodiment, the first network may be an eHRPD network, and the second network may be an HRPD network.

According to an embodiment of the present disclosure, a terminal is provided, which may include an AP and a MODEM, wherein the AP may be configured to retrieve an APN required by establishment of a data link of a connection of a first network after receiving from the MODEM a notice of establishing the connection of the first network, and when an APN retrieval result is null, send to the MODEM a notice of switching to a connection of a second network; and the MODEM may be configured to switch to the second network after receiving from the AP the notice of switching to the connection of the second network, and send to the AP a notice of establishing a data link of the connection of the second network.

In an exemplary embodiment, establishment of the data link of the connection of the first network may require an APN as an access parameter, and establishment of the data link of the connection of the second network may not require any APN as an access parameter.

In an exemplary embodiment, the terminal may be a CDMA system terminal with an eHRPD network access capability.

According to an embodiment of the present disclosure, an AP is provided, which may include:

a receiving component, configured to receive information about a connection of a first network from a MODEM and send the information;

a data link establishment component, configured to retrieve an APN required by establishment of the connection of the first network after receiving the information sent by the receiving component, and when an APN retrieval result is null, send information, stop a data link establishment flow and send information indicating that a data link of the connection of the first network is not established;

a sending component, configured to send to the MODEM a notice of switching to a connection of a second network after receiving the information sent by the data link establishment component;

wherein the receiving component is further configured to, after receiving information about the connection of the second network from the MODEM, send the information to the data link establishment component; and the data link establishment component is further configured to initiate a data link establishment flow of the connection of the second network, wherein the data link establishment component requires an APN as an access parameter for establishment of the data link of the connection of the first network, and does not require any APN as an access parameter for establishment of a data link of the connection of the second network.

According to an embodiment of the present disclosure, a MODEM is provided, which may include:

a network connection component, configured to establish a connection of a first network;

a sending component, configured to send information about the connection of the first network to an AP to initiate a data link establishment flow of the connection of the first network; and a receiving component, configured to, after receiving from the AP a notice of switching to a connection of a second network, send to the network connection component a notice of establishing the connection of the second network, wherein after the network connection component establishes the connection of the second network, the sending component is configured to send information about the connection of the second network to the AP to initiate a data link establishment flow of the connection of the second network, wherein initiation of a data link of the connection of the first network requires an APN as an access parameter, and initiation of a data link of the connection of the second network does not require any APN as an access parameter.

According to the solutions provided by the embodiments of the present disclosure, when the mobile terminal in the first network fails to acquire the APN required by the connection of the first network and therefore cannot use a data service, the mobile terminal can automatically switch to the second network to establish the data link, so that the problem that the data service is unavailable in such a scenario is solved.

BRIEF DESCRIPTION OF THE DRAWINGS

The drawings described here are adopted to provide further understanding of the present disclosure, and form a part of the present disclosure. Schematic embodiments of the present disclosure and descriptions thereof are adopted to explain the present disclosure and not intended to form improper limits to the present disclosure. In the drawings.

DETAILED DESCRIPTION OF THE EMBODIMENTS

Figure 1:
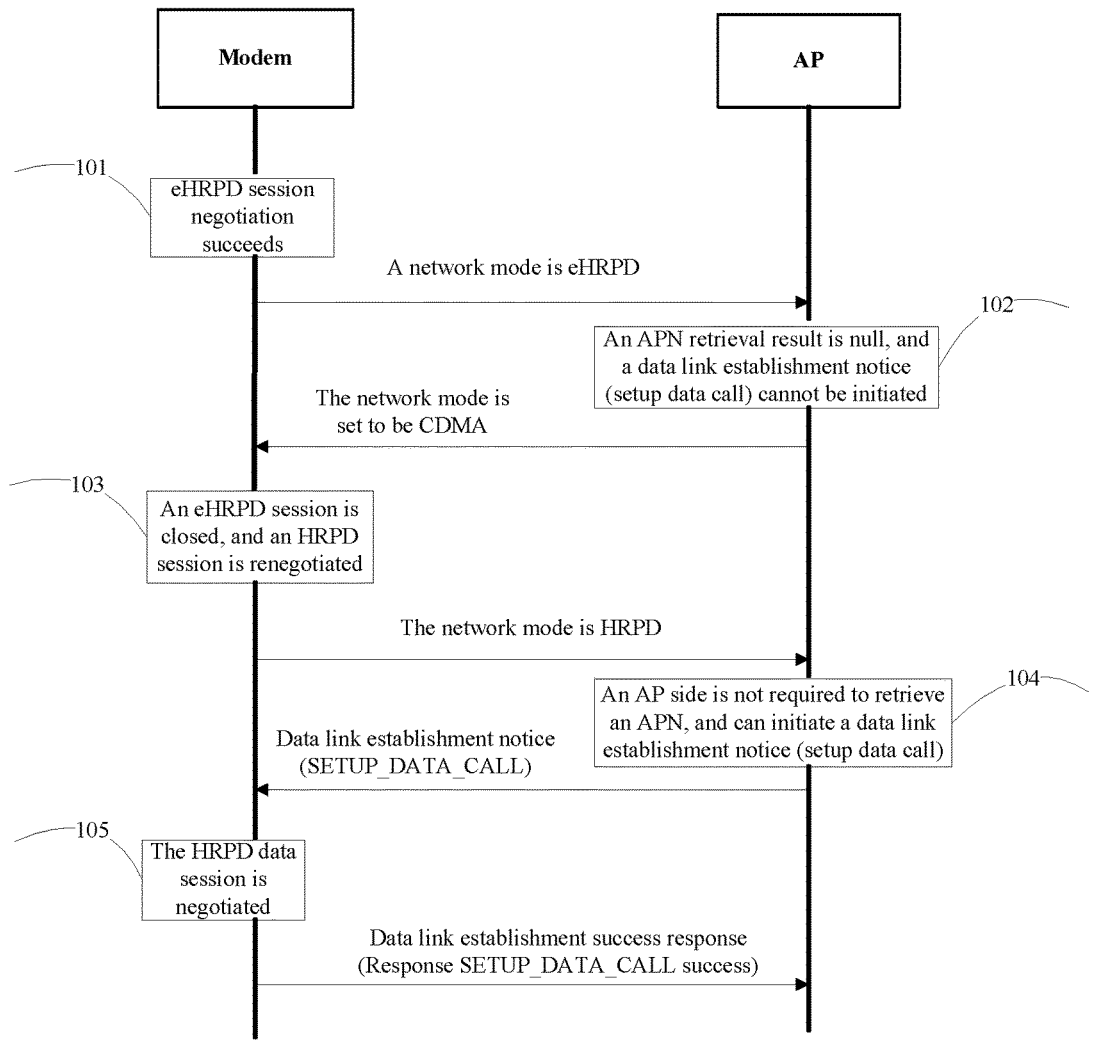
FIG. 1 is a diagram of interaction between a MODEM and an AP according to an embodiment of the present disclosure.

The present disclosure will be described below with reference to the drawings and embodiments in detail. It is important to note that embodiments in the present disclosure and characteristics in the embodiments may be combined under the condition of no conflicts. In addition, it should be noted that representations and descriptions about components and processing unrelated to the present disclosure and known by those skilled in the art are eliminated in the drawings and the specification to make the purpose clear.

The embodiments of the present disclosure provide a terminal and an automatic data link switching method for a terminal.

The method includes that: an AP retrieves an APN required by establishment of a connection of a first network after receiving from a MODEM (also called a wireless side) a notice of establishing the connection of the first network, and when an APN retrieval result is null, sends to the MODEM a notice of switching to a connection of a second network, wherein establishment of a data link of the connection of the first network requires an APN as an access parameter, and establishment of a data link of the connection of the second network does not require any APN as an access parameter; and the MODEM switches to the second network after receiving from the AP the notice of switching to the connection of the second network, and sends a notice to the AP.

The terminal includes an AP side and a MODEM side, wherein the AP side is configured to retrieve an APN required by establishment of a connection of a first network after receiving from the MODEM side a notice of establishing the connection of the first network, and when an APN retrieval result is null, send to the MODEM side a notice of switching to a connection of a second network, wherein establishment of a data link of the connection of the first network requires an APN as an access parameter, and establishment of a data link of the connection of the second network does not require any APN as an access parameter; and the MODEM side is configured to switch to the second network after receiving from the AP side the notice of switching to the connection of the second network, and send to the AP side a notice of establishing a data link of the connection of the second network.

In a specific embodiment of the present disclosure, the first network is an eHRPD network, and the second network is an HRPD network. The terminal and a network service provider support an eHRPD mode, and the terminal is a CDMA system terminal with an eHRPD network access capability. Detailed descriptions will be made below with reference to FIG. 1 and FIG. 2.

Referring to FIG. 1, in Step 101, under the condition that the terminal and a network server support the eHRPD network mode, the MODEM side determines the eHRPD network mode after succeeding in eHRPD session negotiation, and notifies the network mode to the AP side.

In Step 102, the AP side retrieves an APN required by establishment of an eHRPD data link in an APN database stored in the terminal after receiving a notice about the network mode from the MODEM side. When determining that the required APN cannot be retrieved, the AP side modifies a network mode setting into CDMA, and notifies the MODEM side of switching to the CDMA mode.

In Step 103, the MODEM side closes existing eHRPD session(s) according to a change in the network mode setting, re-negotiates about an HRPD session, switches to an HRPD network mode and sends a notice to the AP side.

In Step 104, the AP side receives a notice about the network mode from the MODEM side, reinitiates a data link establishment flow, and directly initiates a setup data call instruction in the HRPD network mode without retrieving the APN.

In Step 105, the MODEM side initiates HRPD data session negotiation, and after successful negotiation, notifies the AP side in a form of setup data call success indicating that the data link is successfully established, till now, the whole HRPD data link procedure is completed.

Figure 2:
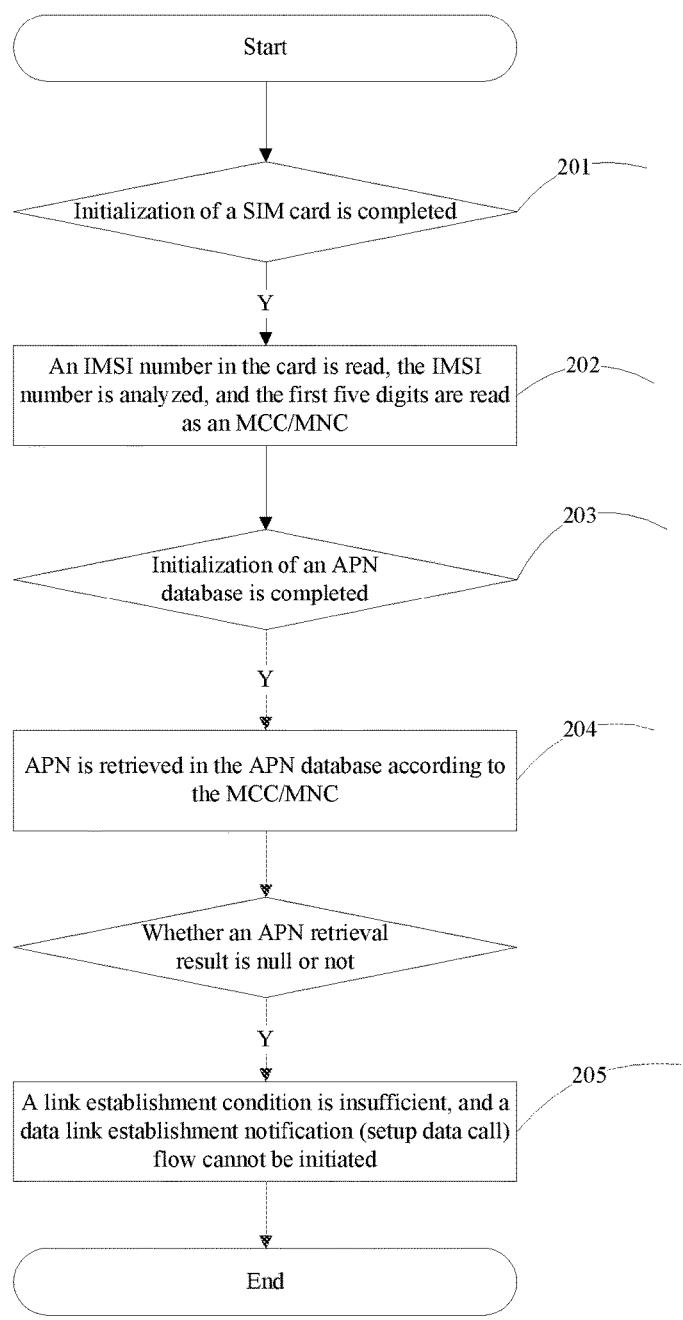
FIG. 2 is a flowchart of retrieving, by an AP, an APN required by an eHRPD data link according to an embodiment of the present disclosure.

In Step 102, the AP side retrieves the APN required by establishment of the eHRPD data link in the APN database stored in the terminal by reading information of a SIM card after receiving the notice about the network mode from the MODEM side. Referring to FIG. 2, specific steps are described as follows.

Step 201: whether the SIM card is initialized or not is judged at first, and the next step is executed after the initialization is completed.

Step 202: the information of the SIM card is read to acquire information of an operating company of the SIM card. In the embodiment, the AP side reads an International Mobile Subscriber Identity (IMSI) number in the SIM card, and analyzes the first five digits which form a Mobile Country Code/Mobile Network Code (MCC/MNC). For example, if an IMSI number of a SIM card is "460011562650019", the first five digits are "46001", "460" forms an MCC and "01" forms an MNC, it can be determined, according to a network identification code table, that the SIM card belongs to China Unicom. Of course, in other embodiments, the information of the SIM card may be acquired in other manners, not limited to the manner based on the IMSI number.

Each operating company specifies its own APN, that is, the APN of the operating company can be retrieved by virtue of MCCs/MNCs. A terminal manufacturer collects APN information of each operating company and integrates the correspondence in the APN database of the terminal.

Step 203: whether the initialization of the APN database of the terminal is completed in a starting stage or not is judged, and the next step is executed after the initialization is completed.

Step 204: APN is retrieved in the APN database according to the MCC/MNC acquired in Step 202.

Step 205: since the information of the SIM card is inconsistent with terminal customization, an APN retrieval result is null. Because the necessary condition for the initiation of the setup data call instruction in the eHRPD network mode, i.e., the APN being able to be acquired, is not met, a data link establishment process cannot be implemented.

Figure 3:
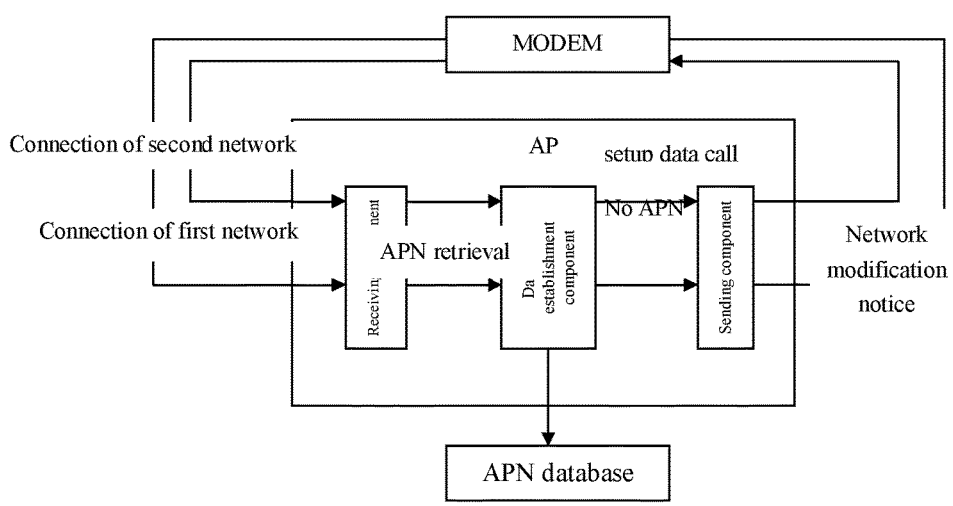
FIG. 3 is a structure diagram of an AP according to an embodiment of the present disclosure.

Referring to FIG. 3, an embodiment of the present disclosure further provides an AP. The AP includes a receiving component, a data link establishment component and a sending component. The receiving component is configured to receive a notice about a connection of a first network from a MODEM and send the information. The data link establishment component is configured to retrieve an APN required by establishment of the connection of the first network after receiving the information sent by the receiving component, and when an APN retrieval result is null, send information, stop a data link establishment flow and send information indicating that a data link of the connection of the first network is not established. The sending component is configured to, after receiving the information, send a network modification notice to notify the MODEM of switching to a connection of a second network. The MODEM establishes the connection of the second network and sends a notice to the receiving component. The receiving component sends the notice about the connection of the second network to the data link establishment component. The data link establishment component is not required to retrieve the APN, and can directly initiate a setup data call instruction to initiate the data link establishment flow of the connection of the second network.

Figure 4:
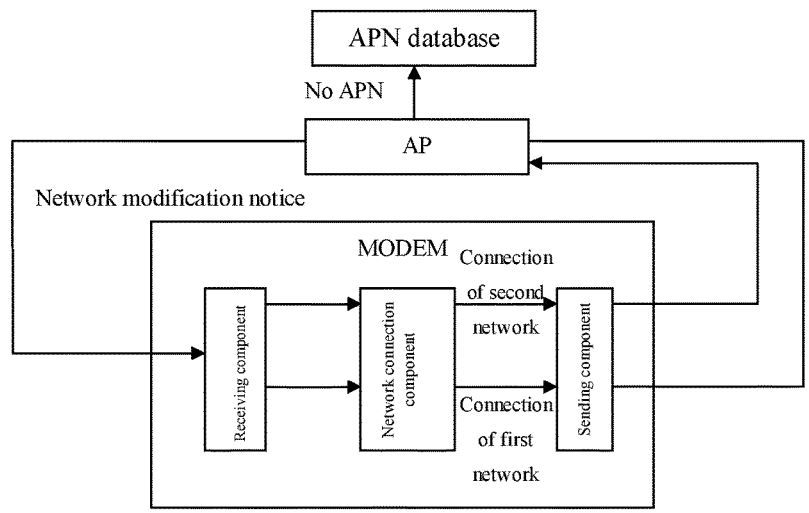
FIG. 4 is a structure diagram of a MODEM according to an embodiment of the present disclosure.

Referring to FIG. 4, an embodiment of the present disclosure further provides a MODEM, which includes a network connection component, a sending component and a receiving component. The network connection component is configured to establish a connection of a first network, and send information to the sending component. The sending component sends the information about the connection of the first network to an AP to initiate a data link establishment flow of the connection of the first network. The AP sends a network connection modification notice when not retrieving an APN required by establishment of the connection of the first network. The receiving component notifies the network connection component of establishing a connection of a second network after receiving the network connection notification notice sent by the AP. After the network connection component establishes the connection of the second network, the sending component sends information about the connection of the second network to the AP to initiate a data link establishment flow of the connection of the second network, wherein initiation of a data link of the connection of the first network requires an APN as an access parameter, and initiation of a data link of the connection of the second network does not require any APN as an access parameter.

According to the above descriptions about the embodiments of the present disclosure, the CDMA system terminal with the eHRPD network access capability can be automatically switched to the HRPD network mode and establish the data link under the condition that there is no APN required by eHRPD and the data link cannot be normally established in an eHRPD network, particularly under the condition that a data service may can be used when no APN is retrieved because of incorrect SIM card information, so that the problem that the data service is unavailable in such a scenario is solved.

Obviously, those skilled in the art should know that each component or each step of the present disclosure may be implemented by a universal computing device, and the components or steps may be concentrated on a single computing device or distributed on a network formed by a plurality of computing devices, and may optionally be implemented by program codes executable for the computing devices, so that the components or steps may be stored in a storage device for execution with the computing devices, the shown or described steps may be executed in sequences different from those described here in some circumstances, or may form each integrated circuit component respectively, or multiple components or steps therein may form a single integrated circuit component for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the appended claims of the present disclosure.

What is claimed is:

1. An automatic data link switching method for a terminal, comprising:
retrieving, by an Application Processor (AP), an Access Point Name (APN) required by establishment of a data link of a connection of a first network after receiving from a MODEM a notice of establishing the connection of the first network, and when an APN retrieval result is null, sending, by the AP, to the MODEM a notice of switching to a connection of a second network; and switching, by the MODEM, to the second network after receiving from the AP the notice of switching to the connection of the second network, and sending, by the MODEM, to the AP a notice of establishing a data link of the connection of the second network;

wherein retrieving the APN required by the establishment of the data link of the connection of the first network comprises: reading information of a Subscriber Identity Module (SIM) card, and retrieving, wherein the information of the SIM card is information of an operating company of the SIM card, and searching the APN database for a matched APN of the operating company according to the information of the operating company of the SIM card, wherein the APN database comprises a pre-integrated correspondence between each operating company and an APN corresponding to the operating company.

2. The automatic data link switching method as claimed in claim 1, wherein establishment of the data link of the connection of the first network requires an APN as an access parameter, and establishment of the data link of the connection of the second network does not require any APN as an access parameter.

3. The automatic data link switching method as claimed in claim 2, wherein the first network is an Enhanced High Rate Packet Data (eHRPD) network, and the second network is a High Rate Packet Data (HRPD) network.

4. The automatic data link switching method as claimed in claim 1, wherein the first network is an Enhanced High Rate Packet Data (eHRPD) network, and the second network is a High Rate Packet Data (HRPD) network.

5. A terminal, comprising an Application Processor (AP) and a MODEM, wherein the AP is configured to retrieve an Access Point Name (APN) required by establishment of a data link of a connection of a first network after receiving from the MODEM a notice of establishing the connection of the first network, and when an APN retrieval result is null, send to the MODEM a notice of switching to a connection of a second network; and the MODEM is configured to switch to the second network after receiving from the AP the notice of switching to the connection of the second network, and send to the AP a notice of establishing a data link of the connection of the second network;

wherein the AP is configured to retrieve the APN required by the establishment of the data link of the connection of the first network in a following manner: reading information of a Subscriber Identity Module (SIM) card, and retrieving, wherein the information of the SIM card is information of an operating company of the SIM card, and searching the APN database for a matched APN of the operating company according to the information of the operating company of the SIM card, wherein the APN database comprises a pre-integrated correspondence between each operating company and an APN corresponding to the operating company.

6. The terminal as claimed in claim 5, wherein establishment of the data link of the connection of the first network requires an APN as an access parameter, and establishment of the data link of the connection of the second network does not require any APN as an access parameter.

7. The terminal as claimed in claim 6, wherein the first network is an Enhanced High Rate Packet Data (eHRPD) network, and the second network is a High Rate Packet Data (HRPD) network.

8. The terminal as claimed in claim 5, wherein the first network is an Enhanced High Rate Packet Data (eHRPD) network, and the second network is a High Rate Packet Data (HRPD) network.

9. An Application Processor (AP), comprising:

a receiving component, configured to receive information about a connection of a first network from a MODEM and send the information;

a data link establishment component, configured to retrieve an Access Point Name (APN) required by establishment of the connection of the first network after receiving the information sent by the receiving component, and when an APN retrieval result is null, send information, stop a data link establishment flow and send information indicating that a data link of the connection of the first network is not established;

a sending component, configured to send to the MODEM a notice of switching to a connection of a second network after receiving the information sent by the data link establishment component;

wherein the receiving component is further configured to, after receiving information about the connection of the second network from the MODEM, send the information to the data link establishment component; and the data link establishment component is further configured to initiate a data link establishment flow of the connection of the second network, wherein the data link establishment component requires an APN as an access parameter for establishment of the data link of the connection of the first network, and does not require any APN as an access parameter for establishment of a data link of the connection of the second network;

wherein the data link establishment component is configured to retrieve the APN required by the establishment of the data link of the connection of the first network in a following manner: reading information of a Subscriber Identity Module (SIM) card, wherein the information of the SIM card is information of an operating company of the SIM card, and searching the APN database for a matched APN of the operating company according to the information of the operating company of the SIM card, wherein the APN database comprises a pre-integrated correspondence between each operating company and an APN corresponding to the operating company.

10. A MODEM, comprising:

a network connection component, configured to establish a connection of a first network;

a sending component, configured to send information about the connection of the first network to an Application Processor (AP) to initiate a data link establishment flow of the connection of the first network to make the AP retrieving an Access Point Name (APN) required by establishment of a data link of a connection of a first network in a following manner: reading information of a Subscriber Identity Module (SIM) card, wherein the information of the SIM card is information of an operating company of the SIM card, and searching the APN database for a matched APN of the operating company according to the information of the operating company of the SIM card, wherein the APN database comprises a pre-integrated correspondence between each operating company and an APN corresponding to the operating company; and a receiving component, configured to, after receiving from the AP a notice of switching to a connection of a second network, send to the network connection component a notice of establishing the connection of the second network, wherein after the network connection component establishes the connection of the second network, the sending component is configured to send information about the connection of the second network to the AP to initiate a data link establishment flow of the connection of the second network, wherein initiation of a data link of the connection of the first network requires an APN as an access parameter, and initiation of a data link of the connection of the second network does not require any APN as an access parameter.

\* \* \* \* \*